(12) United States Patent
Najmi

(10) Patent No.: US 10,311,391 B2
(45) Date of Patent: *Jun. 4, 2019

(54) OPTIMIZING INVENTORY IN ACCORDANCE WITH A CONSTRAINED NETWORK

(71) Applicant: JDA Software Group, Inc., Scottsdale, AZ (US)

(72) Inventor: Adeel Najmi, Plano, TX (US)

(73) Assignee: JDA Software Group, Inc., Scottsdale, AZ (US)

( * ) Notice: Subject to any disclaimer, the term of this patent is extended or adjusted under 35 U.S.C. 154(b) by 401 days.

This patent is subject to a terminal disclaimer.

(21) Appl. No.: 14/951,841

(22) Filed: Nov. 25, 2015

(65) Prior Publication Data

US 2016/0078385 A1    Mar. 17, 2016

Related U.S. Application Data

(63) Continuation of application No. 12/758,303, filed on Apr. 12, 2010, now Pat. No. 9,208,467, which is a
(Continued)

(51) Int. Cl.
    *G06Q 10/06*    (2012.01)
    *G06Q 10/08*    (2012.01)

(52) U.S. Cl.
    CPC ..... *G06Q 10/06315* (2013.01); *G06Q 10/087* (2013.01); *Y10S 707/949* (2013.01)

(58) Field of Classification Search
    CPC .... G06Q 10/087; G06Q 20/203; G06Q 10/08; G06Q 10/0875; G06Q 10/06
(Continued)

(56) References Cited

U.S. PATENT DOCUMENTS 5,931,900 A  *  8/1999  Notani ................. G06Q 10/06
                                                      709/201
5,946,662 A     8/1999  Ettle et al.
(Continued)

FOREIGN PATENT DOCUMENTS

TW          495690         7/2002
TW          552538         9/2003

OTHER PUBLICATIONS

Smith, Stephen A., "Optimal Inventories for an (S-I, S) System With No Backorders", Management Science, vol. 23, No. 5, Copyright 1977, The Institute of Management Sciences, Jan. 1977, pp. 522-528.
(Continued)

*Primary Examiner* — Andrew Joseph Rudy
(74) *Attorney, Agent, or Firm* — Spencer Fane LLP; Steven J. Laureanti

(57) ABSTRACT

In one embodiment, optimizing inventory includes accessing service level band sets. Each service level band set is associated with a policy group, and includes service level bands. Each service level band of a service level band set has a service level priority with respect to any other service level bands of the same service level band set. An inventory band set is determined for each service level band set. Each inventory band set includes inventory bands, where each inventory band satisfies a corresponding service level band assuming an unconstrained network. Each inventory band of an inventory band set has an inventory priority with respect to any other inventory bands of the same inventory band set. A feasible supply chain plan that satisfies the inventory band sets is generated in order of the inventory priorities until a constrained network is depleted.

15 Claims, 2 Drawing Sheets

Related U.S. Application Data continuation of application No. 10/894,248, filed on Jul. 19, 2004, now Pat. No. 7,721,959.

(58) Field of Classification Search
USPC .................................................. 705/28, 30
See application file for complete search history.

(56) References Cited

U.S. PATENT DOCUMENTS

| | | | |
|---|---|---|---|
| 5,974,395 A | 10/1999 | Bellini et al. | |
| 6,256,664 B1 | 7/2001 | Donoho et al. | |
| 6,292,894 B1 | 9/2001 | Chipman et al. | |
| 6,418,129 B1 | 7/2002 | Fingerhut | |
| 6,493,327 B1 | 12/2002 | Fingerhut | |
| 6,577,304 B1 | 6/2003 | Yablonski et al. | |
| 6,643,556 B1 | 11/2003 | Morenz et al. | |
| 6,782,421 B1 * | 8/2004 | Soles | G06F 11/3452 370/252 |
| 6,889,197 B2 * | 5/2005 | Lidow | G06Q 10/02 705/5 |
| 6,931,434 B1 | 8/2005 | Donoho et al. | |
| 6,983,190 B2 | 1/2006 | Denton et al. | |
| 7,356,393 B1 | 4/2008 | Schlatre et al. | |
| 7,426,484 B2 * | 9/2008 | Joyce | G06Q 10/08 235/385 |
| 7,444,294 B2 | 10/2008 | Nomoto et al. | |
| 7,467,095 B2 | 12/2008 | Ouimet | |
| 7,496,530 B2 | 2/2009 | Cheng et al. | |
| 7,523,483 B2 | 4/2009 | Dogan et al. | |
| 7,552,066 B1 | 6/2009 | Landvater | |
| 7,552,067 B2 | 6/2009 | Nephew et al. | |
| 7,606,743 B2 | 10/2009 | Orzell et al. | |
| 7,711,597 B2 | 5/2010 | Najmi | |
| 7,712,072 B2 | 5/2010 | Najmi | |
| 7,721,959 B2 | 5/2010 | Najmi | |
| 7,739,203 B2 | 6/2010 | Kettner et al. | |
| 7,788,119 B2 * | 8/2010 | Najmi | G06Q 10/06 705/7.22 |
| 7,827,049 B2 * | 11/2010 | Dogan | G06Q 10/06 705/7.31 |
| 7,904,350 B2 | 3/2011 | Ayala et al. | |
| 7,941,331 B2 * | 5/2011 | Dogan | G06Q 10/06 705/7.31 |
| 7,987,107 B2 | 7/2011 | Wilson et al. | |
| 8,036,957 B2 * | 10/2011 | Ettl | G06Q 10/087 705/22 |
| 8,180,623 B2 * | 5/2012 | Lendermann | G06F 17/5009 703/22 |
| 8,392,245 B1 * | 3/2013 | Crawford, Jr. | H04L 67/32 705/14.16 |
| 8,447,644 B2 | 5/2013 | Nephew et al. | |
| 8,665,742 B2 * | 3/2014 | Leung | H04L 1/0003 370/252 |
| 9,208,467 B2 * | 12/2015 | Najmi | G06Q 10/087 |
| 2002/0156663 A1 | 10/2002 | Weber et al. | |
| 2003/0101107 A1 | 5/2003 | Agarwal et al. | |

OTHER PUBLICATIONS

Wolff, Ronald W., "Poisson Arrivals See Times Averages", Operations Research, vol. 30, No. 2, Copyright 1982, Operations Research Society of America, Mar.-Apr. 1982, pp. 223-231.

Federgruen, Awi, et al., "An Efficient Algorithm for Computing Optimal (s, S) Policies", Operations Research, vol. 32, No. 6, Copyright 1984, Operations Research Society of America, Nov.-Dec. 1984, pp. 1268-1285.

Svoronos, Antony, et al., "Evaluation of One-For-One Replenishment Policies for Multiechelon Inventory Systems", Management Science, vol. 37, No. 1, Copyright 1991, The Institute of Mangement Sciences, Jan. 1991, pp. 68-83.

"Improving Service and Market Share with Inventory Optimization; How to improve both your top and bottom lines through superior inventory management", White Paper, i2 Technologies, Inc., Copyright 2003, i2 Technologies, Inc. Sep. 2003, 32 pages.

Johansen, Soren Glud, "Base-stock policies for the lost sales inventory system with Poisson demand and Erlangian lead times", Department of Operations Research, University of Aarhus, Denmark, Nov. 19, 2003, pp. 1-14.

* cited by examiner

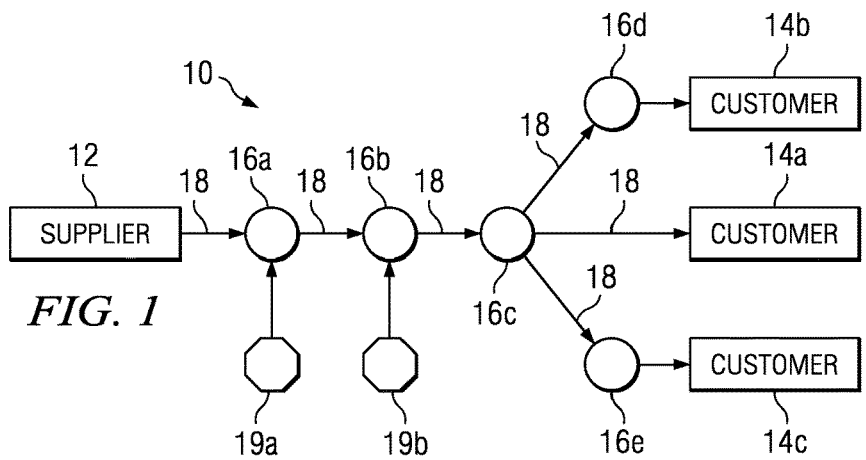

FIG. 1

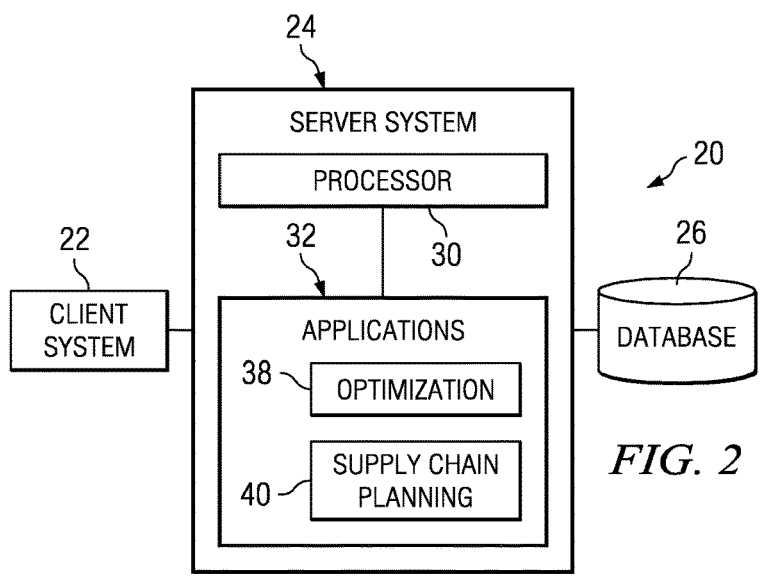

FIG. 2

| GROUP $G_i$ | SERVICE LEVEL BAND SET $x$ = CUSTOMER SERVICE LEVEL | SERVICE LEVEL PRIORITY | INVENTORY BAND SET $y$ = NUMBER OF UNITS |
|---|---|---|---|
| $G_1$ | $B_1 = \{x: 80\% \leq x < 90\%\}$<br>$B_2 = \{x: 90\% \leq x < 99\%\}$<br>$B_3 = \{x: 99\% \leq x\}$ | HIGHEST<br>INTERMEDIATE<br>LOWEST | $I_1 = \{y: 10 \leq y < 12\}$<br>$I_2 = \{y: 12 \leq y < 15\}$<br>$I_3 = \{y: 15 \leq y\}$ |
| $G_2$ | $B_1 = \{x: 75\% \leq x < 85\%\}$<br>$B_2 = \{x: 85\% \leq x < 90\%\}$<br>$B_3 = \{x: 90\% \leq x\}$ | HIGHEST<br>INTERMEDIATE<br>LOWEST | $I_1 = \{y: 5 \leq y < 7\}$<br>$I_2 = \{y: 7 \leq y < 9\}$<br>$I_3 = \{y: 9 \leq y\}$ |
| $G_3$ | $B_1 = \{x: 0\% \leq x < 50\%\}$<br>$B_2 = \{x: 50\% \leq x < 80\%\}$<br>$B_3 = \{x: 80\% \leq x\}$ | HIGHEST<br>INTERMEDIATE<br>LOWEST | $I_1 = \{y: 0 \leq y < 5\}$<br>$I_2 = \{y: 5 \leq y < 8\}$<br>$I_3 = \{y: 8 \leq y\}$ |

FIG. 3

OPTIMIZING INVENTORY IN ACCORDANCE WITH A CONSTRAINED NETWORK

CROSS-REFERENCE TO RELATED APPLICATIONS

This application is a continuation of U.S. patent application Ser. No. 12/758,303, filed on Apr. 12, 2010, entitled "Optimizing Inventory in Accordance with a Constrained Network", now U.S. Pat. No. 9,208,467, which is a continuation of U.S. patent application Ser. No. 10/894,248 filed on Jul. 19, 2004 entitled "Optimizing Inventory in Accordance with a Constrained Network," now U.S. Pat. No. 7,721,959. U.S. Pat. Nos. 9,208,467 and 7,721,959 are commonly assigned to the assignee of the present application. The disclosure of related U.S. Pat. Nos. 9,208,467 and 7,721,959 are hereby incorporated by reference into the present disclosure as if fully set forth herein.

BACKGROUND

1. Technical Field

This invention relates generally to the field of inventory optimization and more specifically to optimizing inventory in accordance with a constrained network.

2. Background

A supply chain supplies products to one or more customers in response to demand. A supply chain may include nodes that store inventory such as the products or components or materials needed to produce the products. The flow of items through the nodes of a supply chain may be subject to feasibility constraints. Some known techniques for determining the amount of inventory to maintain at each node take into account these feasibility constraints. According to one known technique, the amount of demand that may be satisfied with an unconstrained network is calculated, and the demand is then decreased on an ad hoc basis to account for the feasibility constraints. According to another known technique, the flow of items through the supply chain is simulated using assumptions about the feasibility constraints. These known techniques for determining inventory in accordance with feasibility constraints, however, may be inefficient and may fail to provide a desired level of accuracy.

SUMMARY OF THE INVENTION

In accordance with the present invention, one or more disadvantages and problems associated with previous techniques for optimizing inventory may be reduced or eliminated.

According to one embodiment of the present invention, optimizing inventory includes accessing service level band sets. Each service level band set is associated with a policy group, and includes service level bands. Each service level band of a service level band set has a service level priority with respect to any other service level bands of the same service level band set. An inventory band set is determined for each service level band set. Each inventory band set includes inventory bands, where each inventory band satisfies a corresponding service level band assuming an unconstrained network. Each inventory band of an inventory band set has an inventory priority with respect to any other inventory bands of the same inventory band set. A feasible supply chain plan that satisfies the inventory band sets is generated in order of the inventory priorities until a constrained network is depleted.

Certain embodiments of the invention may provide one or more technical advantages. For example, a technical advantage of certain embodiments is that an optimized inventory that takes into account feasibility constraints may be calculated. As another example, a technical advantage of certain embodiments is that feasible customer service levels that may be satisfied in light of feasibility constraints may be determined. Certain embodiments of the invention may include all, some, or none of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 1 is a block diagram illustrating an example supply chain that receives supplies from one or more suppliers and provides products to one or more customers;

FIG. 2 is a block diagram illustrating an example system for optimizing inventory in accordance with one or more feasibility constraints;

FIG. 3 is a table illustrating example service level band sets and example inventory band sets.

DESCRIPTION OF EXAMPLE EMBODIMENTS

Figure 4:
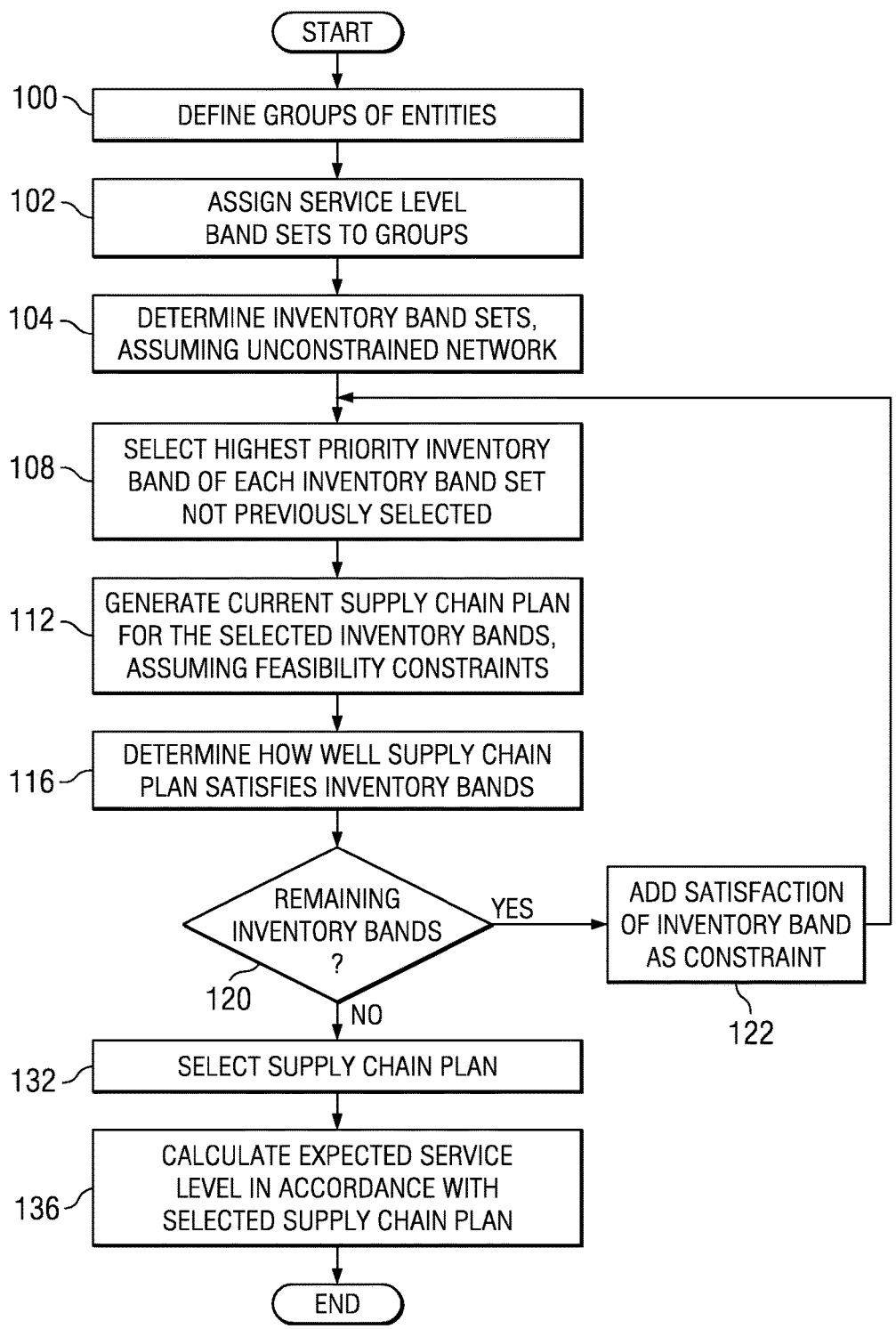
FIG. 4 is a flowchart illustrating an example method for optimizing inventory in accordance with one or more feasibility constraints.

FIG. 1 is a block diagram illustrating an example supply chain 10 that receives supplies from one or more suppliers 12 and provides products to one or more customers 14. According to one embodiment, prioritized service level bands may be assigned to the entities of supply chain 10, and corresponding prioritized inventory bands may be calculated for the service level bands. A feasible supply chain plan that satisfies the inventory bands in order of priority until a constrained network is depleted may be calculated. Feasible customer service levels may be determined from the feasible supply chain plan.

Supply chain 10 may include any suitable number of nodes 16 and any suitable number of arcs 18 configured in any suitable manner. Downstream refers to the direction from suppliers 12 to customers 14, and upstream refers to the direction from customers 14 to suppliers 12. In the illustrated example, supplier 12 supplies items to node 16a, which supplies items to node 16b. Node 16b supplies items to node 16c, which provides items to customer 14a and also supplies items to nodes 16d and 16e. Nodes 16d and 16e provide items to customers 14b and 84c, respectively.

Supply chain 10 includes one or more starting nodes 16 upstream from one or more ending nodes 16. Each starting node 16, in this example node 16a, receives items directly from one or more suppliers 12, possibly in addition to items from one or more upstream nodes 16 that each receive items directly or indirectly from one or more suppliers 12. Each ending node 16, in this example nodes 16c-e, supplies items directly to one or more customers 14, possibly in addition to items supplied to one or more downstream nodes 16 that each supply items directly or indirectly to one or more customers 14. A starting node 16 and an ending node 16 may define a path that includes starting node 16, ending node 16, and any intermediate nodes 16 between starting node 16 and ending node 16.

An entity of a supply chain 10 may refer to, for example, an item, a location, a channel, or any combination of the preceding of a supply chain. Items flow through supply chain 10 and may comprise, for example, parts, supplies, or services that may be used to generate products or may comprise the products themselves. A location may refer to a node 16 or an arc 18 of supply chain 10. A channel may relate to the nature of a sale to a customer 14. Inventory on hand may refer to items stored at nodes 16 in order to cover demand and to manage supply risk.

Feasibility constraints 19*a*-*b* constrain nodes 16*a*-*b*, respectively. A feasibility constraint 19 may refer to any suitable constraint that restricts a network, such as a capacity constraint that restricts the inventory on hand of nodes 16. Examples of feasibility constraints 19 may include, for example, a constraint restricting the ability to provide items to a node 16, a constraint restricting the ability to build items at a node 16, a constraint restricting the ability to store items at a node 16, or any other suitable feasibility constraint. Feasibility constraints 19 typically affect the amount of demand that supply chain 10 may satisfy. Accordingly, in a capacity constrained environment, decisions may have to be made regarding which items to build, where to build each item, and how much of each item to build. For example, in certain situations it may be more advantageous to build some of all items, rather than all of one item but none of one or more other items.

Although supply chain 10 is illustrated as having a particular number of suppliers 12, customers 14, nodes 16, and arcs 18, any suitable modifications, additions, or omissions may be made to supply chain 10 without departing from the scope of the invention. For example, supply chain 10 may have more or fewer nodes 16 or arcs 18. As another example, node 16*a* may supply items to node 16*c* rather than to node 16*b*. As another example, node 16*b* may supply items directly to a customer 14.

FIG. 2 is a block diagram illustrating an example system 20 for optimizing inventory III accordance with one or more feasibility constraints. According to one embodiment, system 20 may be used to assign service level bands to the entities of supply chain 10. Prioritized inventory bands may be calculated for the service level bands. System 20 may determine a feasible supply chain plan that satisfies the inventory bands in order of priority until a constrained network, such as a network with a constrained capacity, is depleted. Feasible customer service levels may be determined from the feasible supply chain plan.

According to the illustrated embodiment, system 20 includes a client system 22, a server system 24, and a database 26 coupled as shown in FIG. 1. Client system 22 allows a user to communicate with server system 24 to optimize inventory in supply chain 10 in accordance with feasibility constraints. Server system 24 manages engines or other applications for optimizing inventory in supply chain 10 in accordance with feasibility constraints. Database 26 includes any suitable database, memory, or other data storage arrangement that stores data that may be used by server system 24.

According to the illustrated embodiment, server system 24 includes one or more processors 30 and one or more applications 32 coupled as shown in FIG. 1. Processors 30 manage the operation of server system 24, and may comprise any device operable to accept input, process the input according to predefined rules, and produce an output. In a particular embodiment, processors 30 may comprise parallel processors in a distributed processing environment.

According to the illustrated embodiment, applications 32 includes an optimization engine 38 and a supply chain planning engine 40. Applications 32 may be configured to execute on processors 30 in any suitable manner. As an example, applications 32 may execute on different processors 30. As another example, a primary application 32 and its backup application 32 may execute on different processors 30. Optimization engine 38 optimizes the inventory at nodes 16 of supply chain 10. Inventory may be optimized to minimize on hand inventory that satisfies an input customer service level.

Supply chain planning engine 40 generates a supply chain plan for supply chain 10. According to one embodiment, supply chain planning engine 40 generates a feasible supply chain plan that satisfies inventory bands in order of priority until a constrained network is depleted. The supply chain plan may minimize violations while ensuring that a lower priority inventory band is not satisfied at the expense of a higher priority inventory band. The supply chain plan may report expected on hand inventory for every combination of item, location, and channel for each of a number of time periods. The supply chain plan may also designate the type and number of items at each location of supply chain 10 at a specific time, and the paths over which the items travel to reach the locations.

Supply chain planning engine 40 generates a supply chain plan in accordance with input. Input may include, for example, information about demand, supply, or both. Demand information may include, for example, a demand forecast, work orders, work in progress, other information, or any combination of the preceding. Supply information may include, for example, the amount of supply, the supply lead times, the supply risk, other information, or any combination of the preceding. Input may also include constraints. Constraints may include, for example, feasibility constraints, one or more other types of constraints, or any combination of the preceding.

Client system 22 and server system 24 may each operate on one or more computers and may include appropriate input devices, output devices, mass storage media, processors, memory, or other components for receiving, processing, storing, and communicating information according to the operation of system 20. As used in this document, the term "computer" refers to any suitable device operable to accept input, process the input according to predefined rules, and produce output. Client system 22, server system 24, and database 26 may be integrated or separated according to particular needs. For example, the present invention contemplates the functions of both client system 22 and server system 24 being provided using a single computer system, such as a single personal computer. As another example, database 26 may reside within server system 24. If any combination of client system 22, server system 24, or database 26 are separated, they may be coupled to each other using a local area network (LAN), a metropolitan area network (MAN), a wide area network (WAN), a global computer network such as the Internet, or any other appropriate wireline, optical, wireless, or other link.

Modifications, additions, or omissions may be made to system 20 without departing from the scope of the invention. For example, fewer or other components may perform the operations of system 20. For example, the operations of optimization engine 38 and supply chain planning engine 40 may be performed by one component, or the operations of optimization engine 38 may be performed by more than one component. Additionally, functions may be performed using any suitable logic comprising software, hardware, other logic, or any suitable combination of the preceding.

FIG. 3 is a table 80 illustrating example service level band sets and example inventory band sets. A service level band may be used to designate a range of service levels for a group of entities of supply chain 10. According to one embodiment, a group of entities may refer to a policy group, which comprises a set of entities, such as items, locations, channels, or any combination of the preceding, strategically segmented for a particular purpose. For example, a policy group may refer to a criticality group for which a service level policy is defined.

A service level band may be described using a customer service level, a lead time, one or more other parameters, or any combination of the preceding. For example, a service level band may designate a service level range of at least 80% on time satisfaction of demand. According to one embodiment, a set of one or more service level bands may be assigned to a group. A service level band set may include, for example, the following service level bands assigned to a group: "at least 80% satisfaction" and "greater than 80% satisfaction."

The service level bands of a service level band set may each have a service level priority with respect to the other service level bands of the set. For example, the "at least 80% satisfaction" service level band may have a higher service level priority than that of the "greater than 80% satisfaction" service level band.

Inventory band sets that include inventory bands may be calculated for the service level band sets. An inventory band refers to a range of inventory calculated to satisfy a corresponding service level band, assuming no feasibility constraints, for example, assuming an unconstrained network. An unconstrained network may refer to a network that is not subject to feasibility constraints, and may include an unconstrained capacity that is not subject to capacity constraints.

According to the illustrated embodiment, table 80 includes a group column 82, a service level band set column 84, a service level priority column 86, and an inventory band set column 88. In a particular embodiment, the groups of group column 82 are first defined, then service level band sets of service level band set column 84 are assigned to the groups, and then inventory band sets of inventory band set column 88 that satisfy the service level band sets are calculated.

According to the illustrated embodiment, group column 82 lists groups $G_i$, where i=1, 2, and 3. In a particular embodiment, a group $G_i$ may comprise a policy group. Service level band sets column 84 lists service level band sets for groups $G_i$. According to the illustrated embodiment, each group $G_i$ is associated with a service level band set that includes service level bands $B_j$, where j=1, 2, and 3. In a particular embodiment, a service level band $B_j$ includes a range of customer service levels. A service level band set may include any suitable number of service level bands. Moreover, the service level band sets of different groups $G_i$ need not necessarily include the same number of service level bands. In a particular embodiment, potential service level bands may include a default band. Groups $G_i$ that do not have any other assigned service level band may have the default band assigned to them. During initialization, the default band may be assigned to groups $G_i$.

Service level priority column 86 designates the priorities of the service level bands $B_j$ of the service level band sets. According to the illustrated embodiment, a service level band $B_1$ has a highest priority, a service level band $B_2$ has an intermediate priority, and service level band $B_3$ has a lowest priority. A highest priority service level band may refer to the range of customer service levels that must be satisfied. An intermediate priority may refer to a range of customer service levels that are targeted but not required. A lowest priority may refer to higher customer service levels that would be nice to have, but are not required or targeted. The service level priorities of the service level bands of a service level band set need not necessarily correspond to the service level priorities of the service level bands of another service level band set. For example, service level priorities for one service level band set may include highest, intermediate, and lowest priorities, while the service level priorities of another service level band set may include priorities 1, 2, 3, and 4, where 1 designates the highest priority.

Inventory band sets column 88 lists inventory band sets that are calculated to satisfy the service levels of the corresponding service level band sets. According to the illustrated embodiment, an inventory band set includes inventory bands $I_j$, where j=1, 2, and 3. An inventory band $I_j$ is calculated to satisfy service level band $B_j$. According to the illustrated embodiment, an inventory band $I_j$ includes a range of the number of units that is calculated to satisfy the range of customer service levels, assuming an unconstrained network. An inventory band may be expressed using any suitable parameter, for example, a reorder point, a safety stock value, a minimum lead time delay value, any other suitable parameter, or any combination of the preceding. An inventory band may have an inventory priority that matches the service level priority of the service level band that the inventory band satisfies. For example, the inventory priorities for the inventory bands satisfying a highest priority service level band and a lowest priority service level band may be highest and lowest, respectively.

Alterations or permutations such as modifications, additions, or omissions may be made to table 80 without departing from the scope of the invention.

FIG. 4 is a flowchart illustrating an example method for optimizing inventory in accordance with one or more feasibility constraints. The method begins at step 100, where groups of entities are defined. The groups may comprise, for example, groups $G_j$ of table 80. Service level band sets are assigned to the groups at step 102. The service level band sets for a group include prioritized service level bands that designate the service levels for the group. The service level band sets may comprise, for example, the service level band sets of table 80. Optimization engine 38 determines inventory band sets for the service level band sets, assuming unconstrained network, at step 104. An inventory band satisfies a corresponding service level band, assuming unconstrained network. The inventory band sets may comprise, for example, the inventory band sets of table 80.

The highest priority inventory band of each inventory band set that has not been previously selected is selected at step 108. As an example, inventory bands $I_1$ of table 80 are selected. Supply chain planning engine 40 generates a current supply chain plan for the selected inventory bands, assuming a network constrained by feasibility constraints, at step 112. Supply chain planning engine 40 determines how well the generated supply chain plan satisfies the currently selected inventory band and a previously selected higher priority inventory band at step 116. The measure of how well a supply chain plan satisfies an inventory band may be determined by how much the supply chain plan violates the inventory band. The more a supply chain plan violates the inventory band, the less satisfactory is the supply chain plan.

A supply chain plan may violate an inventory band by not providing inventory within the range of the inventory band or by not providing the inventory within a specified period. For example, a supply chain plan may violate an inventory band by being ten percent short on inventory. According to one embodiment, the insufficiency of the inventory may be required to meet a specified tolerance threshold before being considered a violation.

If there are remaining inventory bands to be selected at step 128, the method proceeds to step 122, where the satisfaction of the current inventory band is added as a constraint for the next inventory band. For example, the satisfaction of a supply chain plan being ten percent short on inventory may be added as a constraint. The method then returns to step 108, where a next inventory band is selected. If there are no remaining inventory bands at step 128, the method proceeds to step 132, where a supply chain plan is selected. A supply chain plan may be selected in accordance with how well the supply chain plan satisfies the inventory bands. For example, a supply chain plan that minimizes violations while ensuring that a lower priority inventory band is not satisfied at the expense of a higher priority inventory band may be selected.

Optimization engine 38 calculates the expected service levels from the selected supply chain plan at step 136. The expected service level takes into account feasibility constraints. Accordingly, the expected service level may be more accurate than service levels calculated based on an unconstrained network. After calculating the expected service levels, the method terminates.

Alterations or permutations such as modifications, additions, or omissions may be made to the method without departing from the scope of the invention. The method may include more, fewer, or other steps. For example, supply chain planning engine 40 may select a tier from a hierarchical priority scheme at step 108. During one or more iterations of the method, the selected tier may comprise the highest priority inventory band of each inventory band set not previously selected as described in the illustrated embodiment. During one or more other iterations, another type of tier may be selected. For example, other types of tiers may represent inventory for certain customers, inventory for booked demand, lowest confidence demand, highest confidence demand, any other suitable parameter, or any combination of the preceding. Additionally, steps may be performed in any suitable order without departing from the scope of the invention.

Certain embodiments of the invention may provide one or more technical advantages. For example, a technical advantage of certain embodiments is that an optimized inventory that takes into account feasibility constraints may be calculated. As another example, a technical advantage of certain embodiments is that feasible customer service levels that may be satisfied in light of feasibility constraints may be determined. Certain embodiments of the invention may include all, some, or none of the above technical advantages. One or more other technical advantages may be readily apparent to one skilled in the art from the figures, descriptions, and claims included herein.

Although an embodiment of the invention and its advantages are described in detail, a person skilled in the art could make various alterations, additions, and omissions without departing from the spirit and scope of the present invention as defined by the appended claims.

To aid the Patent Office and any readers of any patent issued on this application in interpreting the claims appended hereto, applicants wish to note that they do not intend any of the appended claims to invoke 35 U.S.C. § 112, paragraph six, as it exists on the date of filing hereof unless the words "means for" or "step for" are used in the particular claim.

What is claimed is:

1. A system, comprising:
   a database that stores two or more service level band sets, each service level band set being associated with a policy group, each service level band set comprising two or more service level bands, each service level band of a service level band set having a service level priority with respect to any other service level bands of the same service level band set; and
   a computer system coupled to the database and configured to:
   access the two or more service level band sets stored in the database;
   access two or more supply chain entities stored in the database, the two or more supply chain entities comprising at least one starting entity and at least one ending entity, wherein the at least one starting entity receives items directly from one or more suppliers and supplies items to the at least one ending entity, and the at least one ending entity supplies items directly to at least one customer;
   determine an inventory band set for each service level band set, each inventory band set comprising two or more inventory bands, each inventory band satisfying a corresponding service level band assuming an unconstrained network, each inventory band of an inventory band set having an inventory priority with respect to any other inventory bands of the inventory band set;
   restrict a network of the two or more supply chain entities with a feasibility constraint that constrains the two or more supply chain entities; and
   generate a feasible supply chain plan that satisfies the inventory band sets in order of the inventory priorities until a constrained network is depleted.

2. The system of claim 1, wherein the computer system is further configured to:
   select a current inventory band of each inventory band set in accordance with the inventory priority of the current inventory band;
   generate a current supply chain plan that satisfies the current inventory band and any previously selected inventory band; and
   identify the feasible supply chain plan in accordance with the determination.

3. The system of claim 2, wherein the computer system is further configured to select an inventory band having the highest inventory priority of the inventory bands not previously selected from an inventory band set as the current inventory band by selecting the current inventory band of each inventory band set in accordance with the inventory priority of the current inventory band.

4. The system of claim 2, wherein the computer system is further configured to identify the feasible supply chain plan in accordance with the determination by adding a satisfaction of the current inventory band to a constraint set constraining the constrained network for a next inventory band.

5. The system of claim 2, wherein the computer system is further configured to identify the current supply chain plan as the feasible supply chain plan when the current supply chain plan minimizes violation of the current inventory band and the previously selected inventory band to identify the feasible supply chain plan in accordance with the determination.

6. The system of claim 1, wherein the computer system is further configured to establish an expected service level for the policy group in accordance with the feasible supply chain plan.

7. The system of claim 1, wherein the computer system is further configured to:
define the policy group; and
assign a service level band set to the policy group.

8. A computer-implemented method, comprising:
accessing at least one prioritized service level band associated with a policy group and assigned to at least one of two or more supply chain entities of a supply chain network, the two or more entities comprising at least one starting entity and at least one ending entity, wherein the at least one starting entity receives items directly from one or more suppliers and supplies items to the at least one ending entities, and the at least one ending entity supplies items directly to at least one customer;
assessing at least one feasibility constraint that constrains the two or more supply chain entities by restricting a network of the two or more supply chain entities;
calculating two or more prioritized inventory bands corresponding with the at least one prioritized service level band; and
generating a feasible supply chain plan that satisfies the prioritized inventory bands in order of priority until a constrained network is depleted.

9. The computer-implemented method of claim 8, wherein the feasibility constraint comprises a capacity constraint that restricts inventory on hand of the two or more supply chain entities.

10. The computer-implemented method of claim 8, wherein the feasibility constraint comprises a constraint restricting the ability to store items at one of the two or more supply chain entities.

11. The computer-implemented method of claim 8, wherein the feasibility constraint comprises a constraint that restricts the ability to provide items to one of the two or more supply chain entities.

12. A non-transitory computer-readable medium embodied with software, the software when executed using one or more computers is configured to:
access at least one prioritized service level band associated with a policy group and assigned to at least one of two or more supply chain entities of a supply chain network, the two or more entities comprising at least one starting entity and at least one ending entity, wherein the at least one starting entity receives items directly from one or more suppliers and supplies items to the at least one ending entities, and the at least one ending entity supplies items directly to at least one customer;
assess at least one feasibility constraint that constrains the two or more supply chain entities by restricting a network of the two or more supply chain entities;
calculate two or more prioritized inventory bands corresponding with the at least one prioritized service level band; and
generate a feasible supply chain plan that satisfies the prioritized inventory bands in order of priority until a constrained network is depleted.

13. The computer-readable storage medium of claim 12, wherein the feasibility constraint comprises a capacity constraint that restricts inventory on hand of the two or more supply chain entities.

14. The computer-readable storage medium of claim 12, wherein the feasibility constraint comprises a constraint restricting the ability to store items at one of the two or more supply chain entities.

15. The computer-readable storage medium of claim 12, wherein the feasibility constraint comprises a constraint that restricts the ability to provide items to one of the two or more supply chain entities.

* * * * *